United States Patent [19]

Geisseler

[11] 4,308,885
[45] Jan. 5, 1982

[54] TUBULAR SAFETY ELEMENT FOR CLOSING A FLOW LINE

[75] Inventor: Max Geisseler, Winterthur, Switzerland

[73] Assignee: Sulzer Brothers Limited, Winterthur, Switzerland

[21] Appl. No.: 211,818

[22] Filed: Dec. 1, 1980

[30] Foreign Application Priority Data

Dec. 5, 1979 [CH] Switzerland ................. 10776/79

[51] Int. Cl.³ ............................................. F16K 13/04
[52] U.S. Cl. .................................... 137/67; 137/460; 137/498; 137/517; 220/89 A; 220/229; 220/240
[58] Field of Search ................. 137/67, 460, 498, 517; 220/89 A, 229, 240

[56] References Cited

U.S. PATENT DOCUMENTS

| | | | |
|---|---|---|---|
| 3,895,646 | 7/1975 | Howat | 137/517 X |
| 4,053,084 | 10/1977 | Anderson | 220/229 |
| 4,142,544 | 3/1979 | Straub | 137/67 |

*Primary Examiner*—Harold W. Weakley
*Attorney, Agent, or Firm*—Kenyon & Kenyon

[57] ABSTRACT

The collapsible safety element has a polygonal end and a star-shaped end which are interconnected by flat triangular sections. The triangular sections are disposed relative to one another so that the points of the star-shaped end are in line with the corners at the polygon-shaped end. Consequently, when the safety element is closed, the triangular sections extending from the star-shaped end are disposed in parallel relation to each other. This improves and increases the sealing effect of the safety element at high pressure.

9 Claims, 12 Drawing Figures

U.S. Patent  Jan. 5, 1982  Sheet 1 of 2  4,308,885
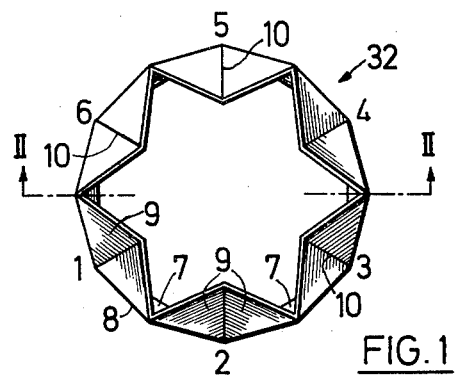
FIG.1
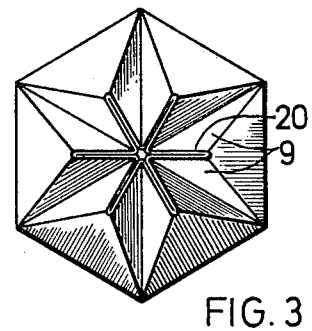
FIG.3
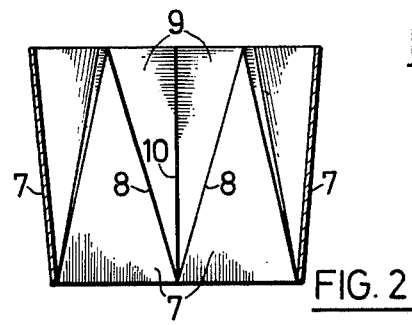
FIG.2
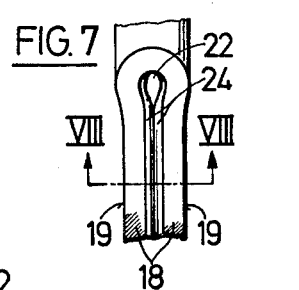
FIG.7
FIG.8
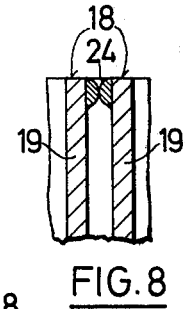
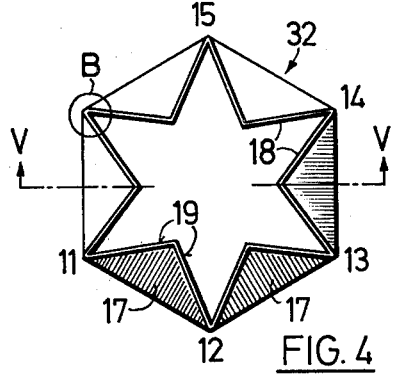
FIG.4
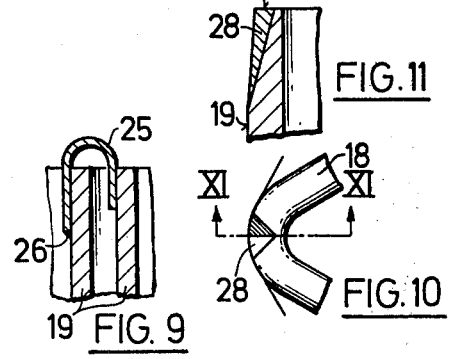
FIG.9
FIG.11
FIG.10
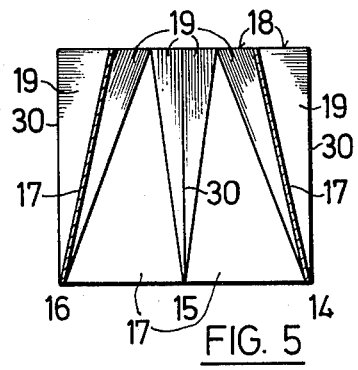
FIG.5
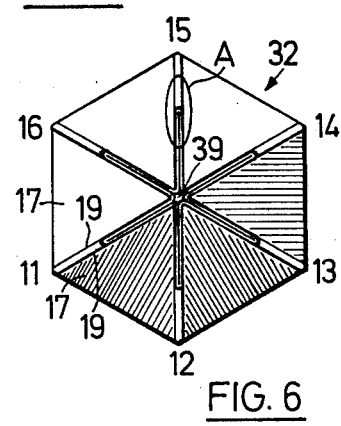
FIG.6

TUBULAR SAFETY ELEMENT FOR CLOSING A FLOW LINE

This invention relates to a safety element. More particularly, this invention relates to a safety element for closing a flow line.

As is known, various types of safety elements have been used for closing off flow lines, such as a line leading from a pressurized storage vessel. In many cases, the safety element is provided in order to prevent a medium which is stored in the pressure vessel from rapidly flowing out in the event of a fracture in a line connected to the vessel. In such cases, the safety element is disposed at the place where the line is connected to the vessel and is constructed so as to deform and close the line if a pressure difference between the vessel and the line reaches a predetermined value. One such safety element is described in U.S. Pat. No. 4,142,544. In this case, the safety element is collapsible and is formed at one end with a star-shaped cross-section having n-projecting points and n-re-entrant angles whereas the other end is formed as an n-sided polygon. The two ends are connected by flat triangular sections with the corners of the polygon displaced in the circumferential direction relative to the points of the star-shaped end.

However, it has been found that a structure such as described in U.S. Pat. No. 4,142,544 must have relatively thick walls in order to withstand a high pressure difference when closed. Because of the thick walls, a correspondingly high pressure difference is required in order to close the element. Further, in order to produce this high pressure difference if a line fractures and a large amount flows out while the element is in an open state, the opening cross-section of the safety element at the star-shaped end must be made relatively small in the open state. As a result, the safety element causes a relatively high pressure loss during operation.

Accordingly, it is an object of the invention to improve the known safety element.

It is another object of the invention to provide a safety element which does not impart a high pressure loss during normal operation.

It is another object of the invention to provide a collapsible safety element for closing a flow line which does not significantly interfere with normal operation.

Briefly, the invention provides a tubular safety element for closing a flow line which defines a flow path and which is peripherally folded to form a star-shaped cross-section having n-points at one end with pairs of triangular sections extending from this end to form a respective point and a regular polygonal cross-section defining n-sides at an opposite end. In addition, each side of the regular polygonal cross-section has a corner in line with a respective point at the star-shaped end. The element is collapsible under a predetermined differential pressure between the exterior of the element and the interior of the element with each pair of triangular sections defining a respective point being disposed in parallel relation.

The element is constructed so that a number of triangular sections extend from the polygonal end toward the star-shaped end.

When the safety element is closed, i.e. collapsed, the triangular sections which form the points of the star-shaped end are in parallel and an axially extending sealing area is formed by these sections. In addition, the triangular sections extending from the polygon-shaped end bear very closely against one another. Thus, the element has a given wall thickness which can undergo a greater pressure difference than previously known elements. Thus, an element having the same bearing capacity can have thinner walls, resulting in a smaller pressure loss in normal operation.

The pairs of triangular sections which define the points of the star-shaped end also define a longitudinal edge extending along the element from a point at the star-shaped end to a corner at the polygon-shaped end. Each of these longitudinal edges forms a single fold in the closed state. Consequently, a tight seal is difficult to obtain at these edges. Therefore, the safety element is provided with inwardly projecting sealing means on at least one of the triangular sections at the star-shaped end for sealing against an opposed triangular section with the opposed sections in parallel relation. In such cases, the triangular sections extending from the star-shaped end need not be completely in contact when the element is closed. The sealing means may be formed by relatively hard sealing strips, for example a weld bead or may be in the form of a resilient apron which will easily adapt to any deformation.

In addition, each longitudinal edge extending from the star-shaped end maybe weakened near the end in order to compensate for the reinforcement produced by the bending of the element along this edge. This weakening may be accomplished by reducing the wall thickness. In this manner, excessive leakage may be prevented from occurring at the edges.

These and other objects and advantages of the invention will become more apparent from the following detailed description taken in conjunction with the accompanying drawings wherein:

FIG. 1 illustrates a plan view of a known safety element;

FIG. 2 illustrates a cross-section view taken on line II—II of FIG. 1;

FIG. 3 illustrates a plan view of the element of FIG. 1 in a collapsed state;

FIG. 4 illustrates a plan view of a safety element constructed in accordance with the invention in an open state;

FIG. 5 illustrates a view taken on line V—V of FIG. 4;

FIG. 6 illustrates a plan view of the safety element of FIG. 4 in a collapsed state;

FIG. 7 illustrates an enlarged detail A of FIG. 6 indicating a sealing means in accordance with the invention;

FIG. 8 illustrates a view taken on line VIII—VIII of FIG. 7;

FIG. 9 illustrates a view similar to FIG. 8 of a modified sealing means in accordance with the invention;

FIG. 10 illustrates an enlarged detail B of FIG. 4;

FIG. 11 illustrates a view taken on line XI—XI of FIG. 10; and

Figure 12:
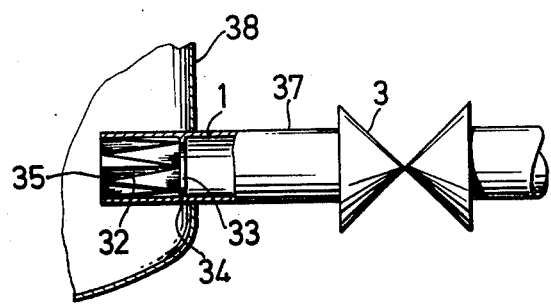
FIG. 12 illustrates a safety element of the invention disposed in a flow line to a pressure vessel in accordance with the invention.

Referring to FIGS. 1 and 2, a known safety element is constructed in a manner similar to that described in U.S. Pat. No. 4,142,544. In this regard, the element includes a polygon-shaped end and a star-shaped end. The polygon-shaped end is in the form of a regular polygon having corners 1,2,3,4,5,6, with isosceles triangular sections 7 extending towards the star-shaped end. These sections 7 are directed to point slightly outwardly. In addition, the equal sides 8 of the triangular sections 7 are connected to triangular sections 9 which extend from the star-shaped end. As indicated, the triangular sections 9 are interconnected along an edge or fold line 10.

Referring to FIG. 3, when the safety element is collapsed, the adjacent triangular sections 9 meet at a substantially radial closure edge 20 while cooperating to form an acute angle.

Referring to FIGS. 4 and 5, the tubular safety element 32 of the invention is peripherally folded to form a star-shaped cross-section having n-points at one end and a regular polygonal cross-section having n-sides at the opposite ends.

As shown in FIG. 5, a plurality of triangular sections 17 extend from the polygonal end toward the star-shaped end and form corners 11-16 of the regular polygon. As shown in FIG. 5, pairs of triangular sections 19 in the form of isosceles triangles extend from the star-shaped end towards the polygonal end. These pairs of triangular sections 19 are adjacent to the triangular sections 17. Also, each pair of triangular sections 19 is separated by a fold line 30. In this respect, all of the fold lines of the safety element 32 are directed in an opposite direction from the element of FIGS. 1-3 so that the fold line 30 to the triangular sections 19 projects outwards in contrast to the corresponding fold line 10 of FIG. 1.

As indicated in FIGS. 4 and 5, each of the triangular sections 19 forms a radial edge 18 at the star-shaped end and each pair of triangular sections 19 forms a point at the star-shaped end.

Referring to FIG. 5, each fold line 30 extends from a point at the star-shaped end to a corner 11-16 at the polygon-shaped end. Thus, end corner 11-16 is in line with a respective point at the star-shaped end.

Referring to FIG. 6, when in a closed or collapsed state, each pair of triangular sections 19 of the safety element 32 are folded together into parallel relation. At the same time, the triangular sections 17 form a closed pyramid. In this condition, drop-shaped flow cross-sections 22 (see FIG. 7) are formed between the adjacent sections 19 at the radial edges 18; these drop-shaped cross-sections and a remaining central aperture 39 (see FIG. 6) form leakage points at the element 32.

Referring to FIG. 12, the safety element 32 can be used to close a flow line 37 connected, for example to a pressure vessel 38 which stores a medium in the interior under pressure. In this regard, the flow line 37 defines a flow path for the pressurized medium while the safety element 32 defines a flow path through which the pressurized medium may flow. As indicated, the line 37 extends into the pressure vessel 38 and the safety element 32 is located at the end of the line 37 within the vessel 38. As indicated, the polygonal end 33 of the safety element 32 is secured to a collar 34 within the line 37 so that the star-shaped end 35 is upstream of the polygonal side. In addition, a suitable valve 36 is disposed in the line 37 down-stream of the safety element 32.

The safety element 32 is provided with a wall thickness adequate to withstand the pressure drop during normal flow from the pressure vessel 38 into the line 37. If there is an abrupt increase in the flow through the element 32, for example as a result of a downstream fracture in the line 37, the element 32 will be closed by the increased pressure drop. This pressure drop acts particularly on the triangular sections 17 extending from the polygonal end so as to collapse the element into the the state shown in FIG. 6.

Referring to FIGS. 7 and 8, the drop-shaped flow cross-sections 22 may be reduced by means of inwardly projecting sealing means 24. As shown, each sealing means 24 is provided along an edge 18 of a triangular section 19 near the star-shaped end. Each sealing means 24 is in the form of a weld bead and is disposed opposite a bead 24 on the opposed section 19.

The sealing means 24 may be defined by other suitable sealing strips and may be formed by machining.

Referring to FIG. 9, instead of using a relatively hard sealing strip, the sealing means may be in the form of a resilient apron or strip 25. As indicated, the apron 25 is in the form of a U-shaped bent sheet metal strip which is welded by a seam 26 to the outside of a triangular section 19 with a free end guided in an arc between the inner sides of pairs of adjacent triangular sections 19.

In order to further reduce the drop-shaped cross-sections 22, the safety element 32 can be weakened near the star-shaped end along the longitudinal edges 30. This may be accomplished by sawing, if required, all the way through in the edge direction or, as shown in FIGS. 10 and 11, by means of a groove 28 having a substantially triangular cross-section. As indicated, the groove 28 can extend towards the polygonal side of the element 32 for a limited length. The groove 28 serves to reduce the material cross-section and converts the longitudinal edge 30 into a hinge. The longitudinal edge 30 may also be weakened along its entire length by plane grinding parallel to the ideal edge.

The safety element 32 may also be used as a safety valve. In this case, the element is disposed so that during normal operation, the flow therethrough is from the polygon-end 33 to the star-shaped end 35 (see FIG. 12). If there is a strong flow in the reverse direction, the closure element 32 shuts. In order to increase the sensitivity of the safety element, the ratio of the star surface to the polygon surface is made smaller than that indicated in FIG. 4. For example, the longitudinal edges 30, instead of being disposed vertically to the polygonal surfaces, are inclined inwardly. Further, the circle inscribed in the star-shaped end may be reduced.

The invention thus provides a tubular safety element which is able to collapse on itself to close off a line through which a pressurized flow of medium passes should a differential pressure of predetermined magnitude arise. Further, the safety element can be installed in a flow line without imparting any significant pressure drop in a flow during normal operation.

What is claimed is:

1. A tubular safety element for closing a flow line, said element defining a flow path and being peripherally folded to form a star-shaped cross-section having n-points at one end with pairs of triangular sections extending from said end to form a respective point and a regular polygonal cross-section defining n-sides at an opposite end, each said side having a corner in line with a respective point, said element being collapsible under a predetermined differential pressure between the exterior of said element and the interior of said element with each pair of triangular sections defining a respective point being disposed in parallel relation.

2. A tubular safety element as set forth in claim 1 which further includes inwardly projecting sealing means on at least one of said triangular sections for sealing against an opposed triangular section with said opposed sections in parallel relation.

3. A tubular safety element as set forth in claim 2 wherein said sealing means is a weld bead.

4. A tubular safety element as set forth in claim 2 wherein said sealing means is a resilient apron.

5. A tubular safety element as set forth in claim 1 wherein each pair of triangular sections define a longitudinal edge, and each edge is weakened near said one end.

6. A tubular safety element as set forth in claim 1 made of thin sheet metal.

7. The combination comprising
a line defining a flow path for a pressurized medium; and
a peripherally folded tubular element disposed in said line to define a flow path therethrough, said element being folded to form a star-shaped cross-section having n-points, at one end and a regular polygonal cross-section having n-sides at an opposite end, each said side having a corner in line with a respective point, said element being collapsible under a differential pressure between the exterior of said element and the interior of said element to close said line.

8. The combination comprising
a pressure vessel for storing a medium in an interior thereof under pressure;
a line connected to said pressure vessel in communication with said interior; and
a tubular safety element for closing said line to said vessel interior in response to a fracture in said line to prevent an abrupt outflow of the stored medium into said line, said safety element defining a flow path therethrough and being peripherally folded to form a star-shaped cross-section at one end having pairs of flat triangular surfaces defining n-points and a regular polygonal cross-section at an opposite end having n-sides, each said side having a corner in line with a respective point, said safety element being deformable in response to a pressure drop in said line to close said line to said vessel interior with each pair of triangular surfaces defining a respective point being disposed in parallel relation.

9. The combination as set forth in claim 7 wherein said safety element is disposed in said line with said star-shaped end facing said vessel.

* * * * *